United States Patent [19]
Berthold et al.

[11] Patent Number: 6,033,108
[45] Date of Patent: Mar. 7, 2000

[54] EXTENDED RANGE FIBER-OPTIC TEMPERATURE SENSOR

[75] Inventors: John W. Berthold, Salem; Larry A. Jeffers, Alliance, both of Ohio

[73] Assignee: McDermott Technology, Inc., New Orleans, La.

[21] Appl. No.: 08/355,926

[22] Filed: Dec. 14, 1994

[51] Int. Cl.[7] .................................................. G01K 11/00
[52] U.S. Cl. ............................................................ 374/161
[58] Field of Search ..................................... 374/161, 131; 250/227.14, 227.18, 227.23, 231.1

[56] References Cited

U.S. PATENT DOCUMENTS

| | | | |
|---|---|---|---|
| 4,329,058 | 5/1982 | James et al. | 356/352 |
| 4,437,761 | 3/1984 | Kroger et al. | 356/44 |
| 4,523,092 | 6/1985 | Nelson | 374/161 |
| 4,673,299 | 6/1987 | Dakin | 374/161 |
| 4,689,483 | 8/1987 | Weinberger | 374/161 |
| 4,823,166 | 4/1989 | Hartog et al. | 356/44 |
| 4,859,079 | 8/1989 | Wickersheim et al. | 374/131 |
| 4,942,294 | 7/1990 | Witte | 250/227.14 |
| 4,988,212 | 1/1991 | Sun et al. | 374/161 |
| 5,112,137 | 5/1992 | Wickersheim et al. | 374/131 |
| 5,196,694 | 3/1993 | Berthold et al. | 250/227.16 |
| 5,263,776 | 11/1993 | Abraham et al. | 374/161 |
| 5,396,568 | 3/1995 | Reed et al. | 250/227.23 |
| 5,474,381 | 12/1995 | Moslehi | 374/161 |

FOREIGN PATENT DOCUMENTS

| 2202936 | 10/1988 | United Kingdom | 250/227.14 |
|---|---|---|---|

OTHER PUBLICATIONS

L. Schultheis, H. Amstutz, and M. Kaufmann, "Fiber Optics Temperature Sensing with Ultrathin Silicon Etalons," *Optics Letters* 13, No. 9, Sep. 1988, pp. 782–784.

J.W. Berthold, S.E. Reed and R.G. Sarkis, "Simple, Repeatable, Fiber Optic Intensity Sensor for Temperature Measurement", SPIE OE Fibers '89 Proceedings, vol. 1169, pp. 1–9.

J.C. Hartl, E.W. Saaski, and G.L. Mitchell, "Fiber Optic Temperature Sensor Using Spectral Modulation," SPIE vol. 838, Fiber Optic & Laser Sensors V (1987) p. 257.

*Primary Examiner*—Anthony Knight
*Assistant Examiner*—John L. Beres
*Attorney, Agent, or Firm*—Daniel S. Kalka; Robert J. Edwards

[57] ABSTRACT

An apparatus and method for sensing temperature within a broad temperature range, includes a fiber optic having an etalon at one end for reflecting light supplied at an opposite end by a pair of light sources operating at different wavelengths. The light sources are either applied to the optical fiber at different times for discriminating between the wavelengths and producing a temperature signal based on the two wavelengths, or the light is simultaneously applied to the optical fiber from both sources and thereafter divided into its component wavelengths before reflected and reference light detectors detect light signals at the different wavelengths. Known etalon/optical fiber based temperature sensors having a usual maximum temperature range of 500° C. are thus modified to increase their range to as much as double this range.

8 Claims, 7 Drawing Sheets

EXTENDED RANGE FIBER-OPTIC TEMPERATURE SENSOR

BACKGROUND OF THE INVENTION

1. Field of the Invention

The present invention relates, in general, to temperature sensors, and in particular to a new and useful etalon/fiber optic based temperature sensor.

2. Description of the Related Art

A Fabry-Perot etalon consists of two parallel planar reflecting surfaces separated by a distance $\tau$. Due to interference among the multiply reflected beams from the two reflecting surfaces, the reflectance of an etalon is a strong function of wavelength and the optical path length, $n\tau$; where n is the index of refraction of the medium between the two surfaces.

Mathematically the reflectance can be written as:

$$R = \frac{4r\sin^2(\delta/2) + (r_1^{1/2} - r_2^{1/2})^2}{(1-r)^2 + 4r\sin^2(\delta/2)}$$

Where $r_1$ is the reflectance of the first surface $r_2$ is the reflectance of the second surface $r = (r_1 \cdot r_2)^{1/2}$ and $\delta$=the phase difference between two successive beams and is given by $$\delta = \frac{4\pi n \tau}{\lambda_o}$$

when the illuminator is a collimated beam of wavelength=$\lambda_o$, incident perpendicular to the reflective surfaces.

FIGS. 1 and 2 show how the reflectance changes as a function of $\tau$ and $\lambda_o$, respectively.

The three references L. Schultheis, H. Amstutz, and M. Kaufmann, "Fiber Optic Temperature Sensing With Ultrathin Silicon Etalons," *Optics Letters* 13, No. 9, September 1988, p. 782; J. W. Berthold, S. E. Reed, and R. G. Sarkis "Simple, Repeatable, Fiber Optic Intensity Sensor for Temperature Measurement," *SPIE OE Fibers '89 Proceedings*, Vol. 1169; and J. C. Hartl, E. W. Saaski, and G. L. Mitchell, "Fiber Optic Temperature Sensor Using Spectral Modulation," *SPIE* Vol. 838, Fiber Optic & Laser Sensors V (1987), p. 257; describe temperature sensors that use a thin silicon etalon deposited on the end of an optical fiber. Components of those sensors are shown schematically in FIG. 3.

These sensors consist of:

a narrow band light source 10; an optical fiber 12 that carries the light to the thin film ($\tau$=500 to 1000 nm) silicon etalon 14; a 2×2 fiber optic coupler 16 which serves to divert half of the outgoing light to a reference detector 18 and half of the light reflected from the etalon to a second detector 20; and electronics 22 that ratios the reflected signal I to the reference signal $I_o$ to determine the reflectance of the etalon $R=I/I_o$.

The index of refraction of silicon decreases with temperature causing a change in phase, $\delta$. The resultant effect on the reflectance is shown in FIG. 4 for an etalon with room temperature thickness of 785 nm. The temperature also changes the thickness (thermal expansion) of the etalon but the magnitude is negligible in comparison to the index change.

It can be seen in FIG. 4 that the measured reflectance is a single valued function only over the restricted range from −100° C. to about 400° C. Actually, the limits of this range can be shifted by changing either the wavelength or the thickness, but the upper and lower limits move together yielding a fixed range of about 500° C.

The reference J. C. Hartl, E. W. Saaski, and G. L. Mitchell, "Fiber Optic Temperature Sensor Using Spectral Modulation," *SPIE Vol.* 838, Fiber Optic & Laser Sensors V (1987), p. 257 describes a similar sensor where instead of using a reference detector to compensate for source variations, the signal beam reflected from the etalon is separated into two wavelength bands (both within the narrow 100 nm band of the LED source) by a dichroic beam splitter. The two bands are detected and the ratio of the two provides a signal that is dependent on temperature, but insensitive to changes in source intensity, fiber transmission or connector loss. This approach also yields a range of about 500° C.

SUMMARY OF THE INVENTION

An object of the present invention is to provide an etalon/fiber optic based temperature sensor with increased temperature range, in particular, a sensor having a temperature range of more than 500° C.

According to the present invention, a temperature range of upwards of 1,000° C. is possible.

This is achieved by using two separate light sources which are combined into a single fiber using an appropriate coupler, the light sources being distinguishable by either wavelength or time when they are applied to the fiber optic, or both. The opposite end of the fiber is connected to a thin film etalon. Somewhere intermediate, the light sources and the etalon, a 2×2 coupler splits off half of the light from the fiber and directs it at one end to a pair of reference detectors, and at an opposite end to a pair of signal detectors. This is in the wavelength domain embodiment of the invention. Two pairs of detectors are each serviced by a wavelength-division-multiplexer, and the output signals of the four detectors are supplied to a multiplexer which reads the signals and supplies them to an A/D converter and thereafter to a computer or CPU, for processing.

In the time domain embodiment of the invention, only a single reference and a single signal detector are needed which are likewise serviced by a multiplexer, A/D converter and CPU, for signal processing. The CPU also drives a switching signal that alternates activation of the two light sources for applying first one and then the other light wavelength to the optical fiber.

In both embodiments, one of the wavelengths is utilized to measure temperatures in a lower temperature range, e.g. −100 to +400° C. and the other is used to measure temperatures in a higher temperature range, e.g. 400° C. to 900° C.

The present invention has the advantages of robust fiber optic design plus a broad temperature range, with only a relatively small increase in complexity.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

The present invention uses a thin etalon at the end of a fiber as described in the prior art discussed above. However, a second source is added in order to provide measurement over a range greater than the 500° C. limit discussed above.

Figure 1:
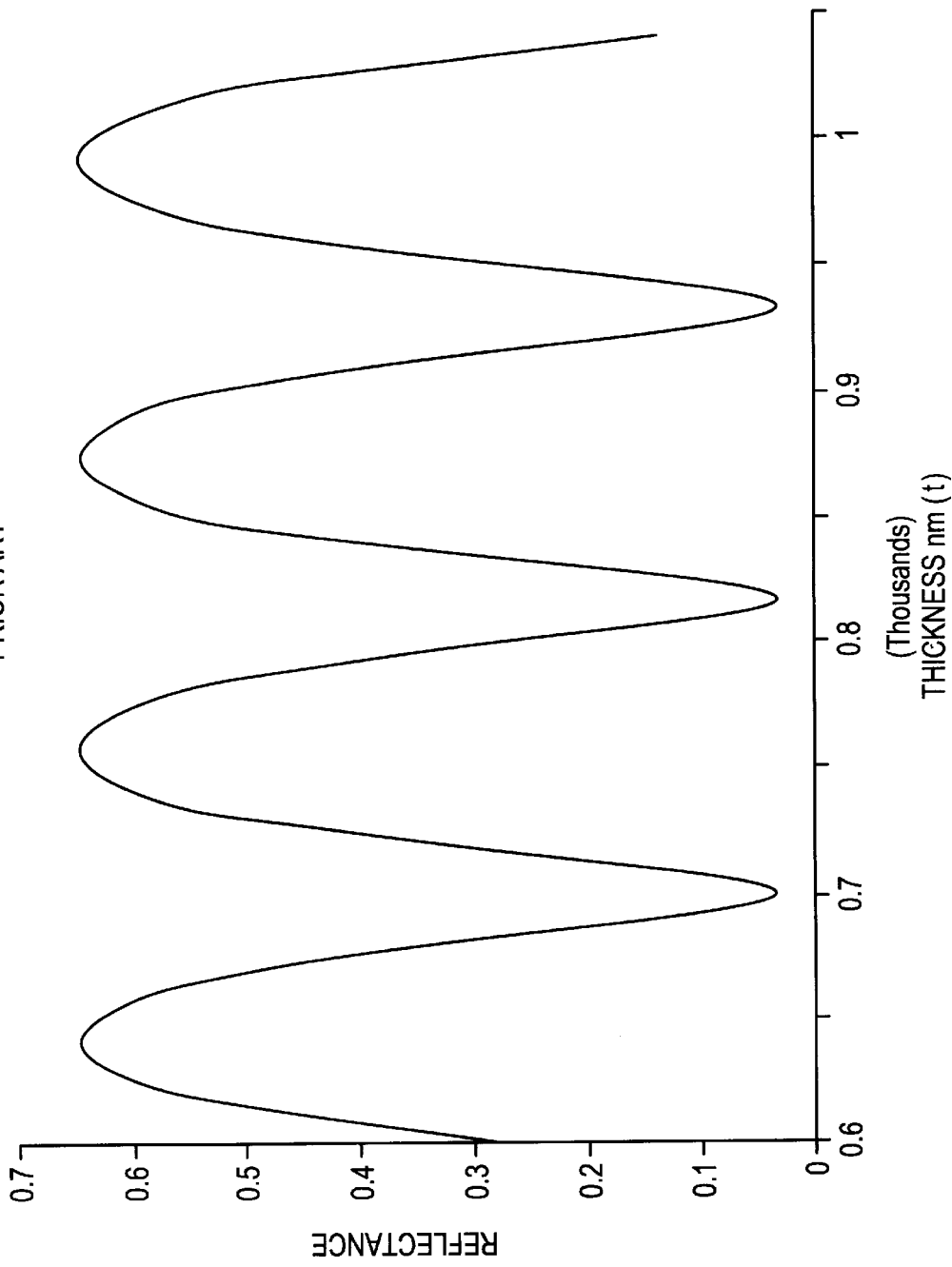
FIG. 1 is a graph plotting reflectance against etalon thickness or distance, which is known in the prior art.
Figure 2:
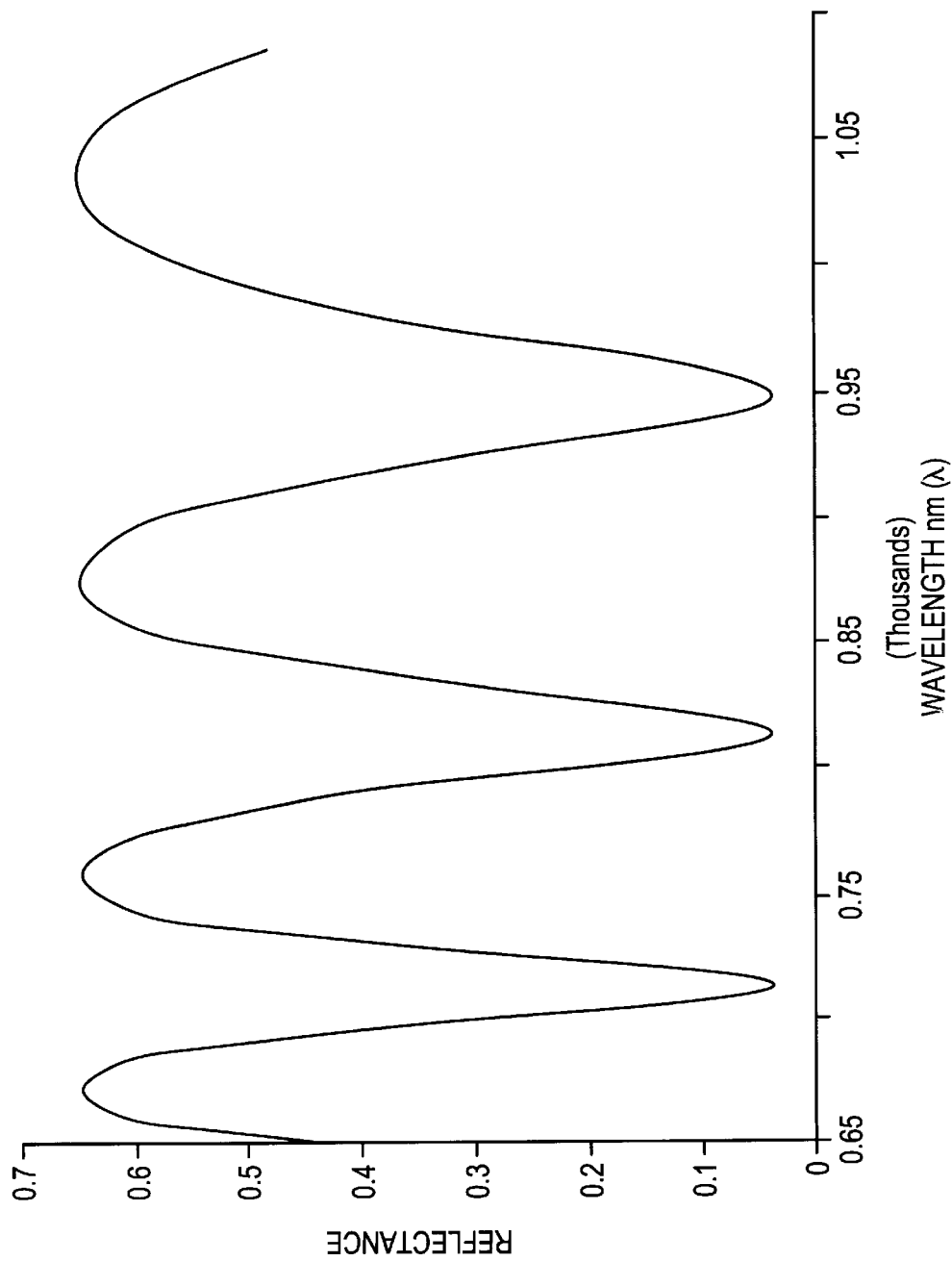
FIG. 2 is a graph similar to FIG. 1 plotting reflectance against wavelength of light.
Figure 3:
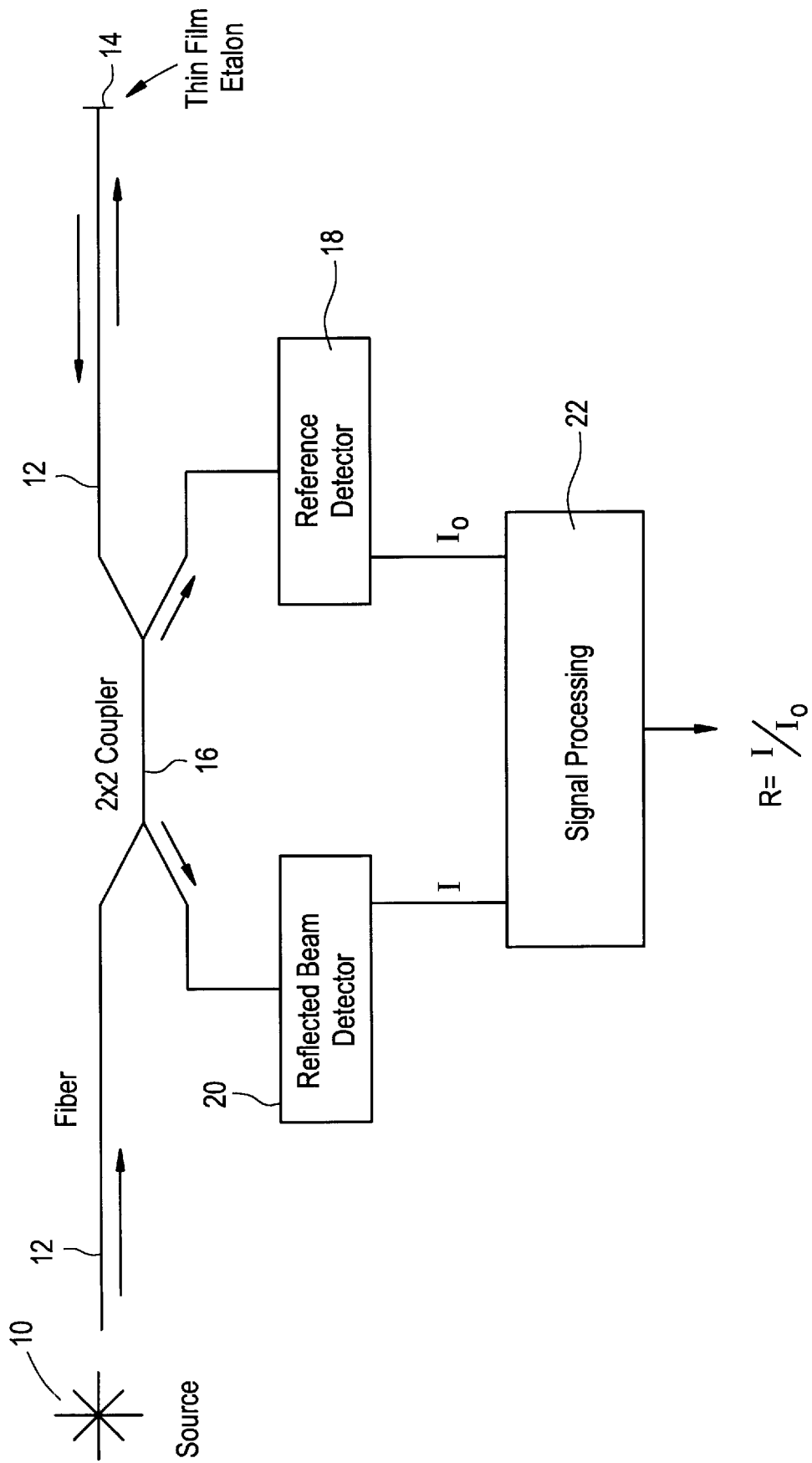
FIG. 3 is a schematic representation of a known etalon/fiber optic based temperature sensor.
Figure 4:
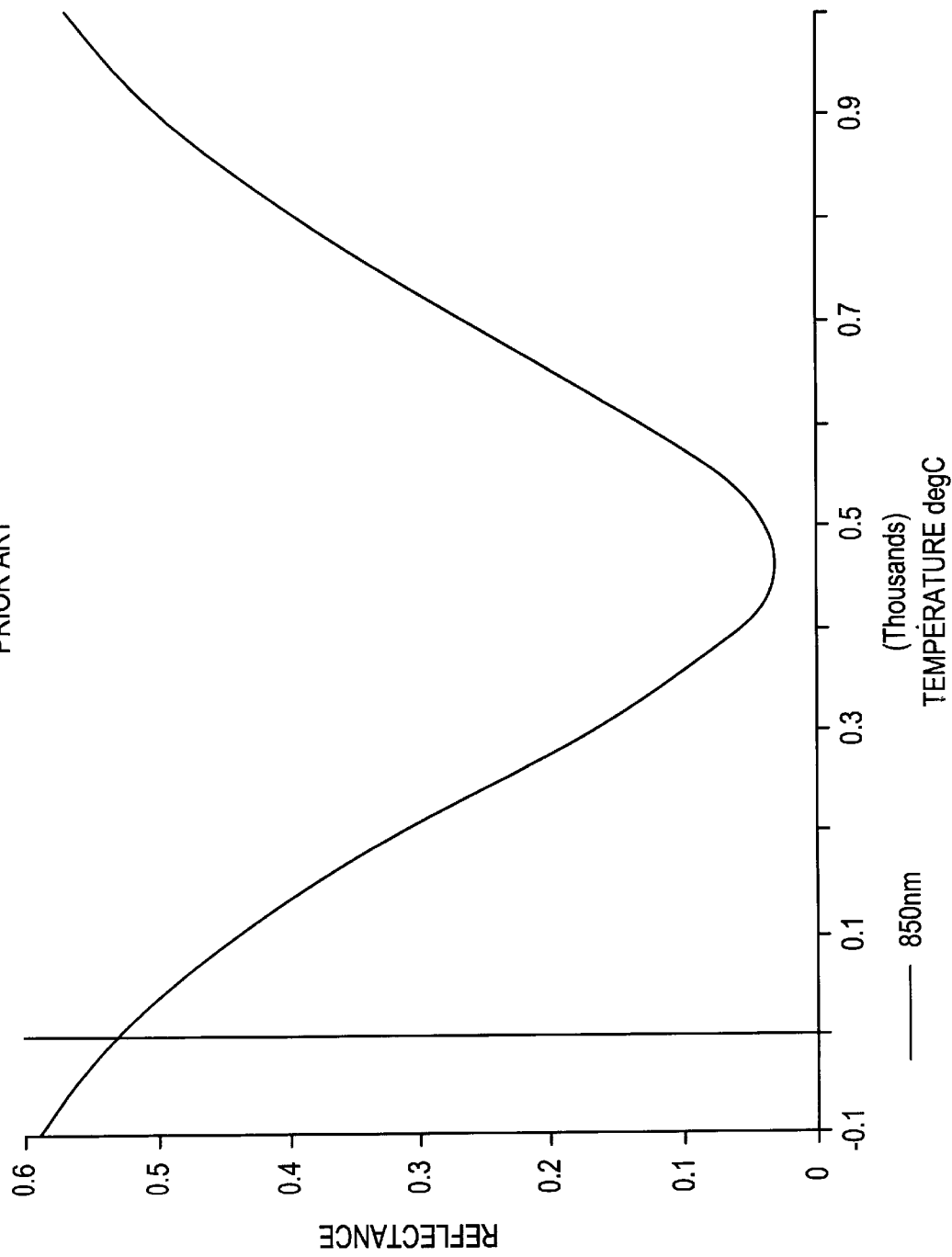
FIG. 4 is a graph similar to FIG. 1 plotting reflectance against temperature at a given etalon thickness and wavelength of light.
Figure 5:
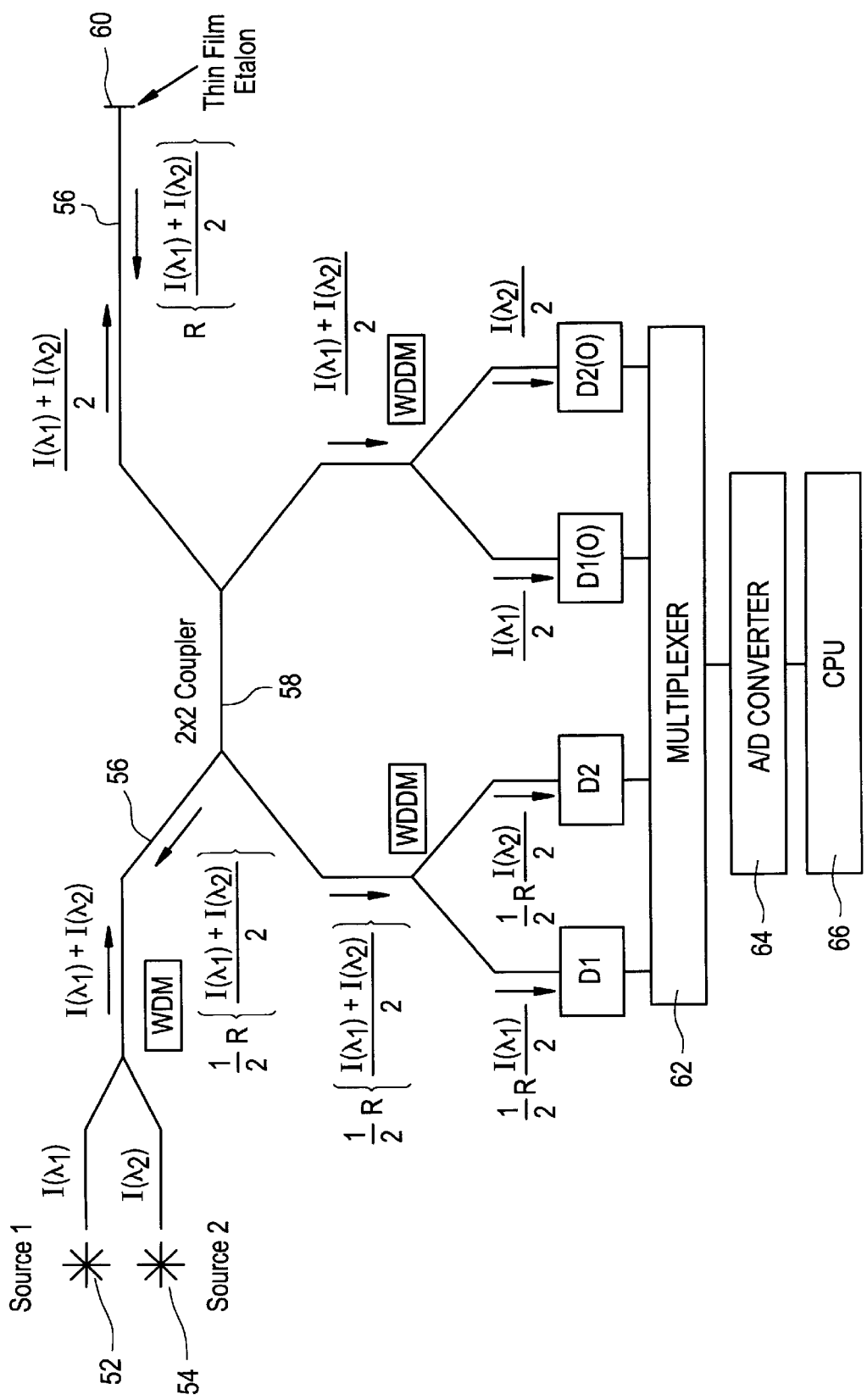
FIG. 5 is a schematic representation of the present invention.

The invention is shown in FIG. 5. The light of two different wavelengths from two sources 52 and 54, is combined into a single fiber 56 using either a standard 2×1 coupler or a wavelength division multiplexer (WDM). The light is then split in half by a 2×2 coupler 58. Half of the light travels to the etalon 60 at the end of the fiber and is reflected, while the other half is directed toward reference detectors $D_1(0)$ and $D_2(0)$.

Reflected light from the etalon is split by the 2×2 coupler 58. Half of it returns to the source and is lost while the balance is directed toward the signal detectors, $D_1$ and $D_2$. Prior to reading the detectors in a multiplexer 62, both the signal and the reference beams encounter wavelength-division-demultiplexers (WDDM) that separate the two wavelengths.

The light intensity reading from each of the four detectors is indicated in FIG. 5 where losses have been neglected in the couplers, multiplexers, and fiber. Neglecting these losses, the ratios of the signal to reference detector outputs cancel out the source intensity yielding a signal proportional to the etalon reflectance as indicated in the equations below:

$$\frac{D_1}{D_1(0)} = \frac{\frac{1}{2}R\frac{I(\lambda 1)}{2}}{\frac{I(\lambda_2)}{2}} = \frac{1}{2}R(\lambda_2)$$

$$\frac{D_2}{D_2(0)} = \frac{\frac{1}{2}R\frac{I(\lambda 2)}{2}}{\frac{I(\lambda_2)}{2}} = \frac{1}{2}R(\lambda_2)$$

Figure 6:
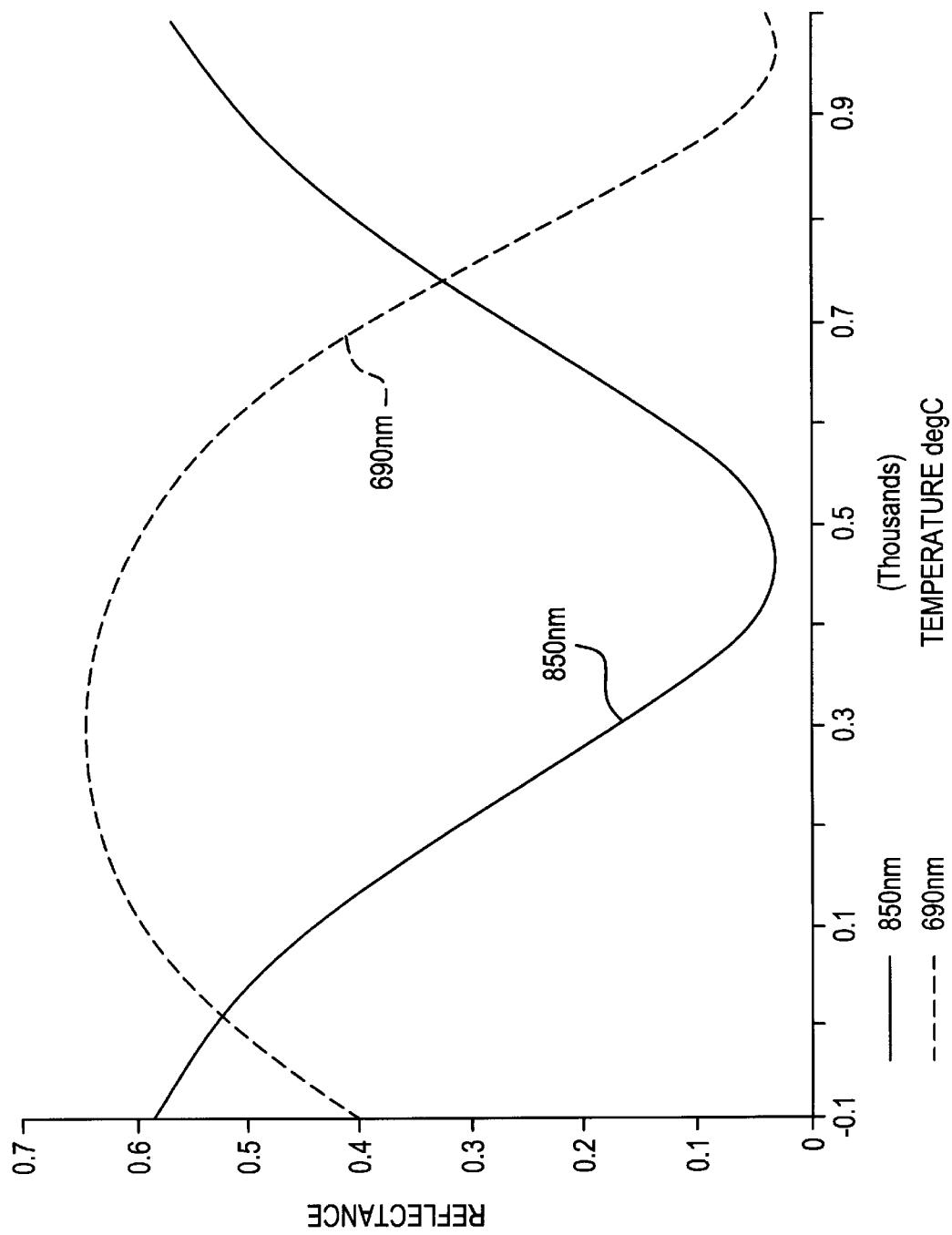
FIG. 6 is a graph plotting reflectance against temperature using the apparatus of the present invention.

The etalon reflectance is dependent on both temperature and wavelength. FIG. 6 shows the reflectance vs temperature of a silicon etalon, for two different wavelengths:

$\lambda_1$=850 nm $\lambda_2$=690 nm

As can be seen, R(850) is single valued over the range from −100 to 400° C. and can be used to give the temperature over this range. From 400° C. to 900° C. the temperature can be determined from R(690), thus yielding a sensor that covers the entire range from −100 to 900° C.

The detectors convert the light intensities to electrical signals that are multiplexed into an analog to digital (A/D) converter 64 that is built into a microcomputer chip. The computer 66 is used to not only control the readout of the detectors but also make the ratio calculations and then convert the measured reflectance values to temperature.

Figure 7:
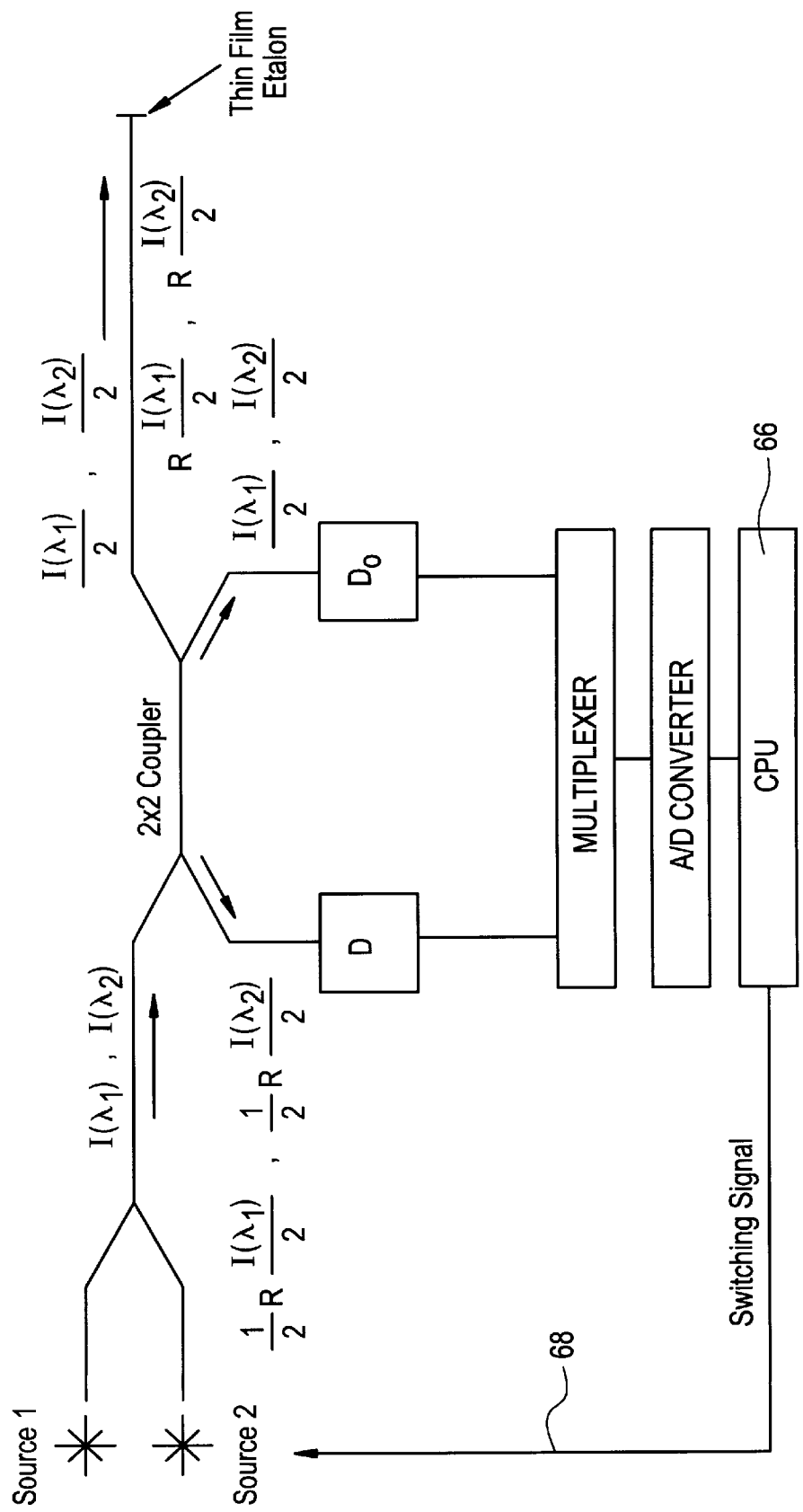
FIG. 7 is a schematic representation of another embodiment of the present invention.

FIG. 7 shows an alternate approach of the invention that yields the same information. In this approach the sources of the invention are alternately turned on and off by the computer over a control line 68 in synchronism with the readout of the detectors. First, Source 1 is turned on, $D=\frac{1}{2}RI(\lambda_1)/2$ and $D_o=\frac{1}{2}(\lambda_1)$ are read and then source 1 is turned off and source 2 is turned on. Then the detector signals $D=\frac{1}{2}RI(\lambda_2)/2$ and $D_o=\frac{1}{2}I(\lambda_2)$ are read. Once the computer has read each of the four signals it determines $R(\lambda_1)$ and $R(\lambda_2)$ and then calculates the temperature using previously stored calibration information about the relationship between $R(\lambda)$ and temperature.

Fiber optic sensors have several inherent advantages over conventional sensors. These include:

immunity to electrical interference (RFI/EMI);

electrical isolation;

inherent safety in explosive environments;

small size;

hostile environment capability; and nuclear radiation resistance.

To realize these potential advantages efforts to develop fiber optic sensors began about 15 years ago and are just now beginning to produce results.

The present invention provides a useable temperature range roughly double that of the previous fiber optic etalon sensors discussed above.

Not only does this widen the range of direct applications where the sensor can be used for temperature measurement, but it also makes this sensor a candidate for use with fiber optic sensors for other measurands that require compensation for temperature variations.

The discussion and calculations above assumed the use of silicon as the etalon material. Silicon has several favorable characteristics, e.g. bonds well to optical fibers, the index of refraction sensitivity to temperature is high, and several techniques suitable for producing thin films on fibers are available. Nevertheless, other materials may also be of use.

Likewise, the use of silica fibers is assumed but the technique of the invention could be used with other materials. For instance, sapphire fibers would extend the upper limit of the temperature range, but suitable fibers are not yet available.

The discussion above assumed $\lambda_1$=850 nm, $\lambda_2$=690 nm, and τ=785 nm. Other wavelength pairs and other thicknesses are also possible.

While specific embodiments of the invention have been shown and described in detail to illustrate the application of the principles of the invention, it will be understood that the invention may be embodied otherwise without departing from such principles.

What is claimed is:

1. A wide range temperature sensor comprising:

two light sources of different wavelengths, a first wavelength being selected to provide a temperature measurement for a lower temperature range of −100° C. to 400° C. and a second wavelength being selected to provide a temperature measurement for a higher temperature range of from 400° C. to 900° C.;

an optical fiber having a first end and an opposite second end;

means for applying light simultaneously from the two light sources, to the first end of the optical fiber for passage of light at the two different wavelengths, along the optical fiber to the second end;

an etalon connected to the second end of the optical fiber for reflecting light from the optical fiber striking the etalon, back into the optical fiber;

a 2×2 coupler optically coupled to the optical fiber at an intermediate location thereon between the first and second ends thereof for diverting a portion of the light from the first end of the optical fiber to a first end of the 2×2 coupler, and for diverting a portion of the reflected light from the second end of the optical fiber to a second end of the coupler;

reference detector means connected to the first end of the coupler for generating a reference signal corresponding to the light from the sources diverted to the first end of the coupler;

signal detector means connected to the second end of the coupler for generating a reflected signal corresponding to reflected light diverted to the second end of the 2×2 coupler;

signal processing means connected to the reference detector means and to the signal detector means for taking a ratio of the reflected signal to the reference signal for light at each of the different wavelengths which is indicative of temperature; and discriminator means connected to at least one of the detector means and signal processing means for discriminating between the ratioes, the discriminator means including a pair of wavelength-division-demultiplexers connected respectively to the first and second ends of the coupler, the reference detector means including a pair of reference detectors each for detecting diverted light of one of the different wavelengths, the signal detector means including a pair of detectors each for detecting diverted reflected light at each of the two different wavelengths.

2. An apparatus according to claim 1, wherein the discriminator means further includes a 2×1 coupler connected between the two light sources and the first end of the optical fiber.

3. An apparatus according to claim 1, including an additional wavelength-division-multiplexer connected between the two light sources and the first end of the optical fiber.

4. An apparatus according to claim 1, wherein the signal processing means comprises a multiplexer connected to the reference detector means and to the signal detector means, an analog-to-digital converter connected to the multiplexer and a signal processing unit connected to the analog-to-digital converter.

5. An apparatus according to claim 1, wherein the optical fiber is silica.

6. An apparatus according to claim 1, wherein the etalon comprises a silicon etalon.

7. An apparatus according to claim 6, wherein the silicon etalon has an etalon thickness of about 785 nm.

8. An apparatus according to claim 6, wherein the two light sources have different wavelengths of 690 and 850 nm, respectively.

* * * * *